US010346303B1

(12) United States Patent
Abrahms et al.

(10) Patent No.: US 10,346,303 B1
(45) Date of Patent: Jul. 9, 2019

(54) ORIGIN SERVER CACHE EVICTION SYSTEM

(71) Applicant: Amazon Technologies, Inc., Seattle, WA (US)

(72) Inventors: Justin Abrahms, Portland, OR (US); Jason LaPier, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 212 days.

(21) Appl. No.: 15/633,507

(22) Filed: Jun. 26, 2017

(51) Int. Cl.
*G06F 9/50* (2006.01)
*G06F 12/084* (2016.01)
*G06F 12/0813* (2016.01)

(52) U.S. Cl.
CPC ........ *G06F 12/0813* (2013.01); *G06F 9/5038* (2013.01); *G06F 12/084* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 6,772,199 B1* | 8/2004 | Keller, Jr. | ............. | G06F 12/126 709/213 |
| 8,370,460 B1* | 2/2013 | Khakpour | ......... | H04L 29/08729 709/203 |
| 8,566,152 B1* | 10/2013 | Shaw | ..................... | G06Q 30/02 705/14.1 |
| 8,577,724 B1* | 11/2013 | Gandhi | ............. | G06Q 30/0241 705/14.49 |
| 2002/0161911 A1* | 10/2002 | Pinckney, III | ..... | H04N 7/17336 709/231 |
| 2009/0113068 A1* | 4/2009 | Fujihira | .................. | H04L 63/08 709/231 |
| 2010/0042749 A1* | 2/2010 | Barton | .................. | G06F 1/3203 710/1 |
| 2012/0124165 A1* | 5/2012 | Richardson | ......... | H04L 61/1511 709/217 |
| 2012/0158815 A1* | 6/2012 | Kelly | .................. | G06F 16/9574 709/201 |
| 2012/0289147 A1* | 11/2012 | Raleigh | ............... | H04L 67/2847 455/3.06 |

(Continued)

*Primary Examiner* — Mano Padmanabhan
*Assistant Examiner* — William E. Baughman
(74) *Attorney, Agent, or Firm* — Knobbe Martens Olson & Bear LLP (57) ABSTRACT

An origin server that uses information submitted by content provider devices to determine whether to evict data objects stored locally in a cache is provided herein. For example, content provider devices can submit data object retention requests. The data object retention requests may include a value that represents an importance the content provider places on the delivery of data objects from the local cache rather than from a primary data store. The origin server can evaluate each of the received data object retention requests to determine a ranking of data object retention requests. The origin server can then use the ranking to determine, for a specific block of data object requests or for a specific time period, whether a data object provided by a content provider should be stored in the local cache at least until the block of data object requests are serviced or the specific time period expires.

20 Claims, 6 Drawing Sheets

(56) References Cited

U.S. PATENT DOCUMENTS

| | | | |
|---|---|---|---|
| 2013/0204961 A1* | 8/2013 | Fliam | H04L 67/2885 709/214 |
| 2014/0075109 A1* | 3/2014 | Richardson | G06F 12/0813 711/113 |
| 2014/0082295 A1* | 3/2014 | Beard | G06F 12/0891 711/135 |
| 2015/0134796 A1* | 5/2015 | Theimer | G06F 16/258 709/223 |
| 2015/0229733 A1* | 8/2015 | Yang | H04L 67/2842 709/213 |
| 2015/0281331 A1* | 10/2015 | Steiner | H04L 69/14 709/203 |
| 2015/0332341 A1* | 11/2015 | Gadoury | G06Q 30/0251 705/14.66 |
| 2016/0006830 A1* | 1/2016 | Houdaille | H04L 67/2842 709/213 |

\* cited by examiner

ORIGIN SERVER CACHE EVICTION SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). These computing systems can be interconnected to form what may be referred to as "content delivery networks" (CDNs) or content delivery systems.

Content providers (such as businesses, artists, media distribution services, etc.) can use these CDNs to delivery content in the form of data objects (e.g., representing web sites, web content, or other digital data) to users or clients. Existing routing and addressing technologies can enable multiple computer systems associated with a content delivery system to provide similar or identical data objects to client computing devices. In some instances, a location providing a set of data objects may be referred to as a point-of-presence ("POP"). A content delivery system can maintain POPs over a wide area (or worldwide) to enable the system to efficiently service requests from clients in a variety of locations. A POP within the CDN can maintain all or a portion of the data objects provided by an origin server (e.g., within a data store of the CDN). When a client requests a data object from a POP, the POP can determine whether the requested data object is maintained at the POP. If so, the POP can provide the requested data object to the client directly. If not, the POP may first retrieve the data object from the origin server, and thereafter provide the data object to the client.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, if a POP does not maintain a data object requested by an end user device, the POP can retrieve the data object from the origin server, and thereafter provide the data object to the requesting end user device. Typically, data objects are stored in the origin server, or in a primary data store that is communication with the origin server. Thus, the origin server can retrieve the requested data object from the primary data store in order to service the data object request submitted by the POP. However, retrieving data objects from the primary data store can be time-consuming and/or can increase the load on the origin server itself.

In some cases, the demand for data objects may be high and the origin server may not be able to keep up with the demand in a manner that prevents end users from experiencing content playback delays given the time it may take the origin server to retrieve data objects from the primary data store. Thus, the origin server may maintain locally a data object cache that is shared among multiple content providers, where the data object cache stores all or a portion of the data objects provided by various content providers and that are stored in the primary data store. Accordingly, in certain situations, the origin server can retrieve data objects from the local data object cache rather than from the primary data store, resulting in a quicker fulfillment of the POP-submitted data object requests.

The data object cache in the origin server, however, has a limited capacity. Thus, typical origin servers implement an eviction policy in which infrequently accessed data objects are evicted from the data object cache in favor of more-frequently accessed data objects. For example, the origin server may implement a "least recently used" (LRU) eviction policy, which causes the least recently used data object within the data object cache to be removed whenever the total size of data objects within the data object cache exceeds a threshold amount (e.g., 90% of the total capacity of the data object cache).

While implementing an eviction policy that uses the popularity of data objects to determine which data objects should be evicted from the data object cache allows an origin server to limit the size of the data object cache, such a policy may result in low performance for data objects that are less popular or that are popular for a short amount of time (e.g., due to the time required to retrieve the data objects from the primary data store). For example, some data objects may correspond to live streamed content in which a content provider attempts to broadcast content in real-time (e.g., within a certain time of when the content is captured, such as within 5 seconds of when the content is captured, within 10 seconds of when the content is captured, etc.). In particular, the live stream may include a series of data objects that are provided to the origin server by the content provider over a period of time corresponding to the time length of the live stream. These live stream data objects may not remain popular for a long period of time. Rather, the most popular data object may be the data object most recently received from the content provider (e.g., a data object corresponding to the most recent portion of the live stream) and the popularity may decrease over time. Thus, in some cases, the popularity of a data object may not be apparent until after the demand for the data object has decreased significantly (e.g., the popularity may not be apparent until after a newer data object corresponding to the live stream is received from the content provider). With a popularity-based eviction policy, the origin server then may not be able to take advantage of the benefits provided by the data object cache with respect to live stream data objects because such data objects may not be stored in the data object cache at all (e.g., if other non-live stream data objects remain popular for a long period of time) or not until after the demand for the data objects has decreased significantly. The same may be true of other time-sensitive data objects and/or other data objects in which it is important for a content provider to deliver data objects to end user devices as quickly as possible regardless of the actual popularity of the data objects. Thus, it may be beneficial for an origin server to implement an alternative eviction policy in which content providers can provide information (e.g., an importance of its data objects) that the origin server can take into account when evaluating whether to evict or retain certain data objects stored in the data object cache.

Accordingly, aspects of the present disclosure relate to managing a cache of data objects at an origin server based at least partially on information submitted by content providers, where at least a portion of the cache is reserved or designated to hold data objects associated with a specific content provider or with a specific set of content. More specifically, embodiments of the present disclosure enable content providers to submit data object retention requests to an origin server. A data object retention request may correspond to a specific block or set number of data object requests (e.g., requests submitted by end user devices and/or CDNs to retrieve data objects). Alternatively or in addition, a data object retention request may correspond to one or more time periods. Each data object retention request may further include an indication of an importance of the content provider's data objects (e.g., represented as a data object retention value).

The origin server can evaluate each of the received data object retention requests to determine a ranking of data object retention requests. For example, the origin server may consider an age, popularity, and/or file size of the data objects that originate from a content provider that submitted a data object retention request and/or a data object retention value included in a data object retention request in ranking the data object retention requests. The origin server can then use the ranking to determine, for the specific block of data object requests or for a specific time period, whether a data object received from a content provider should be stored in the local data object cache or stored in the primary data store. The origin server can further use the ranking to determine, for the specific block of data requests or for a specific time period, whether a data object currently stored in the data object cache should be evicted or retained when a new data object is received from a content provider.

By taking into account information provided by the content provider, the origin server can weigh factors other than just the popularity of a data object in determining whether to evict a data object from the data object cache. In some cases, depending on the factors described herein, the origin server may manage the data object cache in a manner such that some data objects are retained in the data object cache for a first period of time, evicted from the data object cache for a second period of time, and then stored once again in the data object cache for a third period of time.

While the techniques disclosed herein are described with respect to the origin server, this is not meant to be limiting. For example, the techniques disclosed herein may be implemented by a POP within a CDN to manage a cache local to the POP.

The foregoing aspects and many of the attendant advantages of this disclosure will become more readily appreciated as the same become better understood by reference to the following detailed description, when taken in conjunction with the accompanying drawings.

Example Origin Cache Eviction Environment

Figure 1:
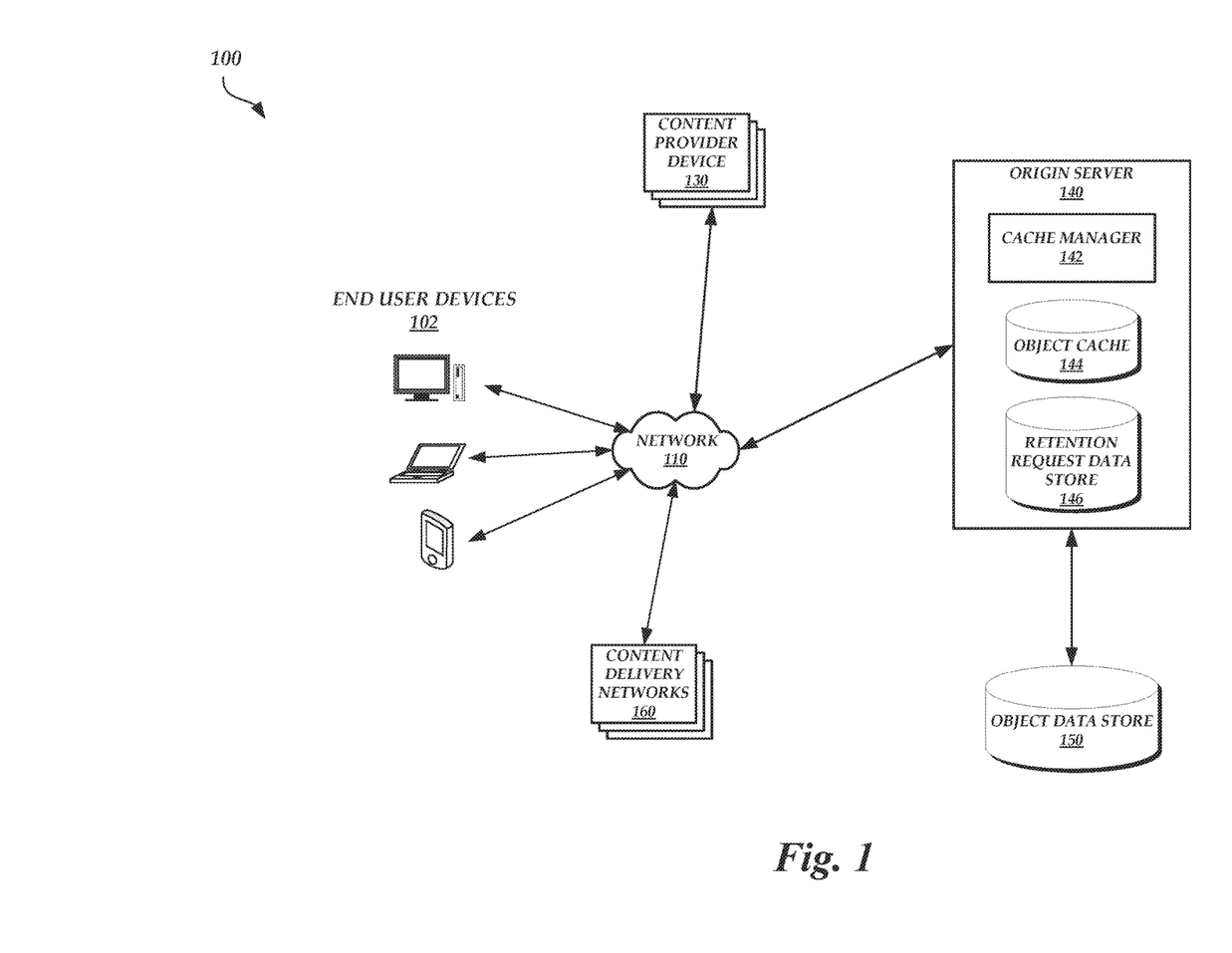
FIG. 1 is a block diagram of an illustrative operating environment in which an origin server may implement an eviction policy based at least in part on information provided one or more content provider devices.

FIG. 1 is a block diagram of an illustrative operating environment 100 in which an origin server 140 may implement an eviction policy based at least in part on information provided one or more content provider devices 130. Various end user devices 102 may communicate with the origin server 140 and/or one or more content delivery networks (CDNs) 160 via a network 110 to request data objects. The operating environment 100 may further include an object data store 150 in communication with the origin server 140.

While the end user devices 102, the origin server 140, and CDNs 160 are shown as grouped within FIG. 1, the end user devices 102, origin server 140, and CDNs 160 may be geographically distant, and independently owned or operated. For example, the end user devices 102 could represent a multitude of users in various global, continental, or regional locations accessing the origin server 140 and/or the CDNs 160. Further, the CDNs 160 may be globally, continentally, or regionally disparate, in order to provide a wide geographical presence for the CDN services implemented therein. Accordingly, the groupings of end user devices 102, the origin server 140, and CDNs 160 within FIG. 1 are intended to represent a logical, rather than physical, grouping.

The origin server 140 may include any computing device owned or operated by an entity that has provided one or more sets of content ("distributions") to a CDN (e.g., CDN 160) for subsequent transmission to end user devices 102. For example, origin server 140 may include servers hosting web sites, streaming audio, video, or multimedia services, data analytics services, or other network-accessible services. As described herein, the origin server 140 may receive content from one or more content provider devices 130 for distribution to the CDNs 160 and/or the end user devices 102. Thus, the origin server 140 may be referred to as a multitenant origin server because the origin server 140 can serve content owned by different content providers. The origin server 140 may include primary versions of content within various distributions (as received from the content provider devices 130). The primary versions of content may be retrieved by the various CDNs 160 for subsequent transmission to the end user devices 102.

In an embodiment, individual CDNs 160 maintain one or more POPs over a wide area to enable the respective CDN 160 to efficiently service requests from end user devices 102 in a variety of locations. The CDNs 160 may each include a cache that stores frequently-requested content. If requested content is not present in the CDN 160 cache, then the CDN 160 may retrieve the content from the origin server 140. In alternate embodiments, not shown, the CDNs 160 may first request the content from an intermediate cache housed within a regional data center. If the requested content is also not present in the intermediate cache, then the CDNs 160 may retrieve the content from the origin server 140.

For simplicity, FIG. 1 depicts a single origin server 140. However, this is not meant to be limiting. For example, multiple origin servers 140 may exist in the operating environment 100, where each origin server 140 implements the functionality described herein.

The origin server 140 may include may include various modules, components, data stores, and/or the like to implement the alternative eviction policy described herein. For example, the origin server 140 includes a cache manager 142, an object cache 144, and a retention request data store 146. The cache manager 142 may implement the eviction policy described herein via management of the object cache 144. The object cache 144 may be the cache local to the origin server 140. In contrast, the object data store 150, which can be external to the origin server 140, may be the data store in which primary copies of data objects received from content provider devices 130 are stored. Thus, the origin server 140 may service a data object request more quickly if the data object is retrieved from the object cache 144 rather than from the object data store 150. Finally, the retention request data store 146 may receive data object retention requests submitted by various content provider devices 130, which is described in greater detail below.

As described herein, a content provider may operate a content provider device 130. The content provider devices 130 may submit data object retention requests to the cache manager 142. The cache manager 142 can use the data object retention requests to determine whether a data object received from a content provider device 130 should be stored in the object cache 144 and/or whether a data object already stored in the object cache 144 should be retained or evicted.

A content provider device 130 can submit two (or more) types of data object retention requests: a data object retention request that corresponds to a block or set number of data object requests (referred to herein as a "request-based data object retention request") or a data object retention request that corresponds to a time period (referred to herein as a "time-based data object retention request").

For example, a content provider device 130 can submit to the cache manager 142 a request-based data object retention request. As described herein, the origin server 140 may service data object requests received from CDNs 160. The origin server 140 may group successive, future data object requests into a block of data object requests. In other words, the origin server 140 may group together a set number of data object requests that are anticipated to be received from one or more CDNs 160 in the future, where the group represents a block of data object requests. As illustrative example, the origin server 140 can group together the next 1000 data object requests that are anticipated to be received from one or more CDNs 160 such that an initial block of data object requests comprises the next 1000 data object requests. The next block of data object requests may comprise the next 1000 data object requests that follow the initial 1000 data object requests comprised within the initial block of data object requests (e.g., data object requests 1001 through 2000), and so on. Content provider devices 130 may submit request-based data object retention requests to the cache manager 142 in an attempt to ensure that the respective content provider's data objects are stored in and/or remain in the object cache 144 (and thus are served from the object cache 144 rather than from the object data store 150) at least until the origin server 140 finishes servicing the block of data object requests (e.g., at least until the origin server 140 finishes servicing each data object request included within the block of data object requests).

In particular, a request-based data object retention request may identify a particular block of data object requests. The request-based data object retention request may also include a data object retention value. The data object retention value can be a numerical value that represents an importance that the content provider places on the delivery of data objects from the object cache 144 rather than from the object data store 150. For example, the data object retention value can be a monetary value that the content provider is willing to pay to guarantee that the content provider's data objects will be stored in the object cache 144 (and thus served from the object cache 144 rather than from the object data store 150) at least until the origin server 140 finishes servicing the identified block of data object requests.

The cache manager 142 can use request-based data object retention requests received from one or more content provider devices 130 to select a content provider for which the cache manager 142 will guarantee that the content provider's data objects will be stored in the object cache 144 (and thus served from the object cache 144 rather than from the object data store 150) at least until the origin server 140 finishes servicing the identified block of data object requests. For example, the cache manager 142 can, for each received request-based data object retention request, use the data object retention value, along with other factors like the age, popularity, and/or file size of data objects corresponding to the content provider associated with the respective request-based data object retention request that are stored in the object cache 144, to score the respective request-based data object retention request. A higher data object retention value, a younger age, a higher popularity, and/or a smaller file size may be factors that result in the cache manager 142 assigning a request-based data object retention request a higher score. Similarly, a lower data object retention value, an older age, a lower popularity, and/or a larger file size may be factors that result in the cache manager 142 assigning a request-based data object retention request a lower score.

Once the cache manager 142 has scored the received request-based data object retention requests, the cache manager 142 can rank the request-based data object retention requests based on the assigned scores. The cache manager 142 may then guarantee that data objects provided by the content provider device 130 that submitted the highest ranked request-based data object retention request will be stored in the object cache 144 at least until the origin server 140 finishes servicing the identified block of data objects.

In some cases, the object cache 144 may have excess capacity even after guaranteeing that the data objects provided by the content provider device 130 that submitted the highest ranked request-based data object retention request will be stored in the object cache 144 at least until the origin server 140 finishes servicing the identified block of data objects. Thus, the cache manager 142 can identify the content provider device 130 that submitted the second-highest ranked request-based data object retention request and either retain in the object cache 144 some or all data objects associated with this content provider device 130 and/or store in the object cache 144 some or all new data objects received from this content provider device 130 to the extent that such data objects do not cause the object cache 144 to exceed its capacity. The cache manager 142 can repeat this process for the next-highest ranked request-based data object retention requests until the object cache 144 no longer has the capacity to store additional data objects. Thus, the cache manager 142 may retain and/or store data objects in the object cache 144 that are provided by content provider devices 130 that submitted higher ranked request-based data object retention requests, may evict data objects from the object cache 144 that are provided by content provider devices 130 that submitted lower ranked request-based data object retention requests, and/or may store new data objects that are provided by content provider devices 130 that submitted lower ranked request-based data object retention requests in the object data store 150 rather than the object cache 144.

The process described above may be repeated for each successive block of data object requests. For example, one or more content provider devices 130 may submit new request-based data object retention requests for the next block of data object requests and the cache manager 142 may repeat the scoring and ranking process described above to identify which data objects should be evicted and retained for the next block of data object requests.

As an illustrative example, a first content provider device 130 may submit a first request-based data object retention request for a first block of data object requests, a second content provider device 130 may submit a second request-based data object retention request for the first block of data object requests, and a third content provider device 130 may submit a third request-based data object retention request for the first block of data object requests. The cache manager 142 may evaluate the request-based data object retention requests as described herein and may score the request-based data object retention requests such that the third request-based data object retention request is ranked first, the second request-based data object retention request is ranked second, and the first request-based data object retention request is ranked last. Thus, the cache manager 142 may guarantee that the data objects provided by the third content provider device 130 will be stored in the object cache 144 at least until the origin server 140 finishes servicing the first block of data object requests. The capacity of the object cache 144 may be such that the object cache 144 can store additional data objects provided by the third content provider device 130, but cannot store data objects provided by the first or second content provider devices 130. Accordingly, the cache manager 142 can evict from the object cache 144 any data objects provided by the first or second content provider devices 130. If the cache manager 142 receives any new data objects from the first or second content provider devices 130 before the first block of data object requests are completely serviced, then the cache manager 142 may store the new data objects in the object data store 150. On the other hand, if the cache manager 142 receives any new data objects from the third content provider device 130 before the first block of data object requests are completely serviced, then the cache manager 142 may store the new data objects in the object cache 144. In addition, if certain data objects provided by the third content provider device 130 are stored in the object data store 150 and not in the object cache 144, then the cache manager 142 may retrieve such data objects from the object data store 150 and store the retrieved data objects in the object cache 144. The first, second, and/or third content provider devices 130 may then submit (e.g., before the first block of data requests are completely serviced) request-based data object retention requests for a second block of data object requests and the cache manager 142 can use the new request-based data object retention requests to re-evaluate which data objects will be evicted and which data objects will be retained while the second block of data object requests are serviced.

As another example, a content provider device 130 can submit to the cache manager 142 a time-based data object retention request. Content provider devices 130 may submit time-based data object retention requests to the cache manager 142 in an attempt to ensure that the respective content provider's data objects are stored in and/or remain in the object cache 144 (and thus are served from the object cache 144 rather than from the object data store 150) at least for a certain period of time.

In particular, a time-based data object retention request may identify one or more time periods Like the request-based data object retention request, the time-based data object retention request may also include a data object retention value. The data object retention value can be a numerical value that represents an importance that the content provider places on the delivery of data objects from the object cache 144 rather than from the object data store 150. Alternatively, the data object retention value can be a function (e.g., a time-decay function) that identifies how the data object retention value should change over different time periods. As an illustrative example, the data object retention value may be a function that indicates that the data object retention value should halve every time period (e.g., the data object retention value is N between 0 and 10 minutes, N/2 between 11 and 20 minutes, N/4 between 21 and 30 minutes, and so on).

The cache manager 142 can use time-based data object retention requests received from one or more content provider devices 130 to select a content provider for which the cache manager 142 will guarantee that the content provider's data objects will be stored in the object cache 144 (and thus served from the object cache 144 rather than from the object data store 150) at least for the identified time period. For example, the cache manager 142 can, for each received time-based data object retention request, use the data object retention value, along with other factors like the age, popularity, and/or file size of data objects corresponding to the content provider associated with the respective time-based data object retention request that are stored in the object cache 144, to score the respective time-based data object retention request.

Once the cache manager 142 has scored the received time-based data object retention requests, the cache manager 142 can rank the time-based data object retention requests based on the assigned scores. The cache manager 142 may then guarantee that data objects provided by the content provider device 130 that submitted the highest ranked time-based data object retention request will be stored in the object cache 144 at least for the identified time period.

Because the data object retention value submitted by a content provider device 130 may change over time (e.g., as defined by the function included in the time-based data object retention request) and/or because some content provider devices 130 may submit time-based data object retention requests for multiple time periods while others may submit time-based data object retention requests for only a single time period or a different set of time periods, the cache manager 142 can repeat the scoring and ranking process periodically (e.g., before the beginning of each time period, as new time-based data object retention requests are received, etc.) and evict or retain data objects in the object cache 144 accordingly. Thus, a time-based data object retention request submitted by a content provider device 130 may be the highest ranked retention request for a first time period and a third time period, but not for a second time period. The cache manager 142 may then retain the data objects provided by the content provider device 130 in the object cache 144 during the first time period, evict the data objects from the object cache 144 during the second time period, and re-store the data objects in the object cache 144 during the third time period.

As described above, the object cache 144 may have excess capacity even after guaranteeing that the data objects provided by the content provider device 130 that submitted the highest ranked time-based data object retention request will be stored in the object cache 144 at least for the identified time period. Thus, the cache manager 142 can identify the content provider device 130 that submitted the second-highest ranked time-based data object retention request and either retain in the object cache 144 data objects associated with this content provider device 130 or store in the object cache 144 new data objects received from this content provider device 130 to the extent that such data objects do not cause the object cache 144 to exceed its capacity. The cache manager 142 can repeat this process for the next-highest ranked time-based data object retention requests until the object cache 144 no longer has the capacity to store additional data objects.

In further embodiments, while the cache manager 142 may allocate space in the object cache 144 to a content provider based on an evaluation of received data object retention requests, end user devices 102 may not necessarily be requesting data objects provided by the content provider continuously. For example, the cache manager 142 may guarantee that the data objects provided by a first content provider will be stored in the object cache 144 for 24 hours. However, end user devices 102 may request data objects provided by the first content provider for only 18 of the 24 hours. Thus, the cache manager 142 can solicit and/or receive data object retention requests that correspond to the remaining 6 hours of the day. For these 6 hours in which end user devices 102 are not requesting data objects provided by the first content provider, the data objects provided by the first content provider can be temporarily evicted from the object cache 144 to provide space for the data objects of another content provider that submitted the highest ranked data object retention request for the otherwise unused 6 hours of the day.

The cache manager 142 can store request-based and/or time-based data object retention requests in the retention request data store 146. For example, some request-based data object retention requests may identify multiple blocks of data object requests and/or some time-based data object retention requests may identify multiple time periods. Thus, the cache manager 142 can store these data object retention requests in the retention request data store 146 such that the cache manager 142 can retrieve the stored data object retention requests for use in scoring and ranking data object retention requests that correspond to the next block of data object requests and/or the next time period.

As described above, the object data store 150 stores copies of data objects (e.g., primary copies of data objects) provided by the content provider devices 130. For example, the cache manager 142 can receive a data object from a content provider device 130. Based on the scoring and ranking process described herein, the cache manager 142 can determine whether to store the data object in the object cache 144 or the object data store 150. If the cache manager 142 stores the data object in the object cache 144, a data object replicator (not shown) operated by the origin server 140 or the cache manager 142 can copy the data object and store the copy of the data object in the object data store 150 in a background process. Otherwise, if the cache manager 142 does not store the data object in the object cache 144, then the cache manager 142 may store the data object directly in the object data store 150.

Users, by way of end user devices 102, may interact with a CDN 160 to request content (e.g., a data object). For the purposes of the present disclosure, the requested data object is not present in the cache maintained by the CDN 160. Thus, the CDN 160 forwards the data object request to the origin server 140, which is received by the cache manager 142. The cache manager 142 can query the object cache 144 to determine whether the requested data object is present therein. If the requested data object is stored in the object cache 144, then the cache manager 142 can retrieve the data object from the object cache 144 and transmit the retrieved data object to the CDN 160 for distribution to the end user device 102 that requested the data object. On the other hand, if the requested data object is not stored in the object cache 144, then the cache manager 142 can retrieve the data object from the object data store 150 and transmit the retrieved data object to the CDN 160 for distribution to the end user device 102 that requested the data object.

In further embodiments, an end user device 102 can submit a data object retention request to speed up content playback. For example, an end user device 102 may request one or more data objects in order to play content in a media player. If the end user device 102 media player exhibits noticeable delays in content playback due to the fact that the origin server 140 is retrieving data objects from the object data store 150 rather than from the object cache 144, then end user device 102 can submit a data object retention request in an attempt to guarantee that future requested data objects are stored in the object cache 144 rather than the object data store 150. For example, the data object retention request can reference one or more blocks of data object requests (e.g., a number of data object requests that would need to be submitted by the media player to finish playback of the content) and/or one or more time periods (e.g., a time period corresponding to the length of time remaining before the media player finishes content playback). The cache manager 142 can process data object retention requests received from one or more end user devices 102 in a manner as described herein with respect to request-based and time-based data object retention requests in order to determine which data objects to store in the object cache 144 and/or which data objects to evict from the object cache 144. If the cache manager 142 determines that a rank of a data object retention request submitted by a first end user device 102 is the highest rank, then cache manager 142 may store in the object cache 144 the data objects corresponding to the content that the media player of the first end user device 102 is playing.

In some cases, a first end user device 102 and a second end user device 102 may be requesting the same data objects (e.g., both end user devices 102 are playing the same content). If a data object retention request submitted by the first end user device 102 is ranked higher than a data object retention request submitted by the second end user device 102 or the second end user device 102 does not even submit a data object retention request, then the cache manager 142 may implement techniques to ensure that the second end user device 102 does not benefit from the data objects being stored in the object cache 144 as a result of the data object retention request submitted by the first end user device 102. For example, the CDN 160 and/or origin server 140 may generate a custom manifest for the first end user device 102, where the custom manifest includes uniform resource locators (URLs) that point to versions of the data objects that are stored in the object cache 144. Thus, when the first end user device 102 submits a request for a first data object, the cache manager 142 may retrieve the first data object from the object cache 144 to service the request. However, when the second end user device 102 submits a request for the first data object, the provided URL may not reference the object cache 144 and thus the cache manager 142 may retrieve the first data object from the object data store 150 to service the request. As another example, the cache manager 142 may transmit unique metadata to the first end user device 102 (e.g., via the CDN 160) for inclusion in a header of future data object requests. In response to receiving the unique metadata in the header of a data object request, the cache manager 142 can retrieve the requested data object from the object cache 144. If the unique metadata is not included in the header of a data object request, then the cache manager 142 can either retrieve the requested data object from the object cache 144 after a threshold time period has passed (e.g., the cache manager 142 can introduce a delay in the service of the requested data object) or retrieve the requested data object from the object data store 150.

In further embodiments, third party content, such as data objects that represent an item advertisement, may be inserted between data objects provided by a content provider device 130. The item advertisement data objects may be associated with a value (e.g., a monetary value corresponding to an amount paid by an entity to insert the item advertisement data objects between data objects provided by a content provider device 130) and the content provider device 130 can indicate to the cache manager 142 that the value associated with the item advertisement data objects will be the data object retention value for a future data object retention request. Thus, the content provider device 130 can tie the data object retention value included in a data object retention request to the value associated with the item advertisement data objects that are inserted between the data objects provided by the content provider device 130.

Various example end user devices 102 are shown in FIG. 1, including a desktop computer, laptop, and a mobile phone, each provided by way of illustration. In general, the end user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. An end user device 102 may execute an application (e.g., a media player, a browser, etc.) that submits requests for data objects to the CDNs 160 when, for example, a user attempts to playback content, view a network page (e.g., a content page, a Web page, etc.), and/or the like.

The content provider devices 130 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A content provider device 130 may be present at a location where content is being captured (e.g., an arena, a studio, a newsworthy site, etc.) and may receive such content from one or more on-site cameras. The content provider device 130 can convert the content captured from the one or more on-site cameras into data objects that can be transmitted via the network 110 to the origin server 140.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Managing the Origin Server Object Cache

Figure 2A:
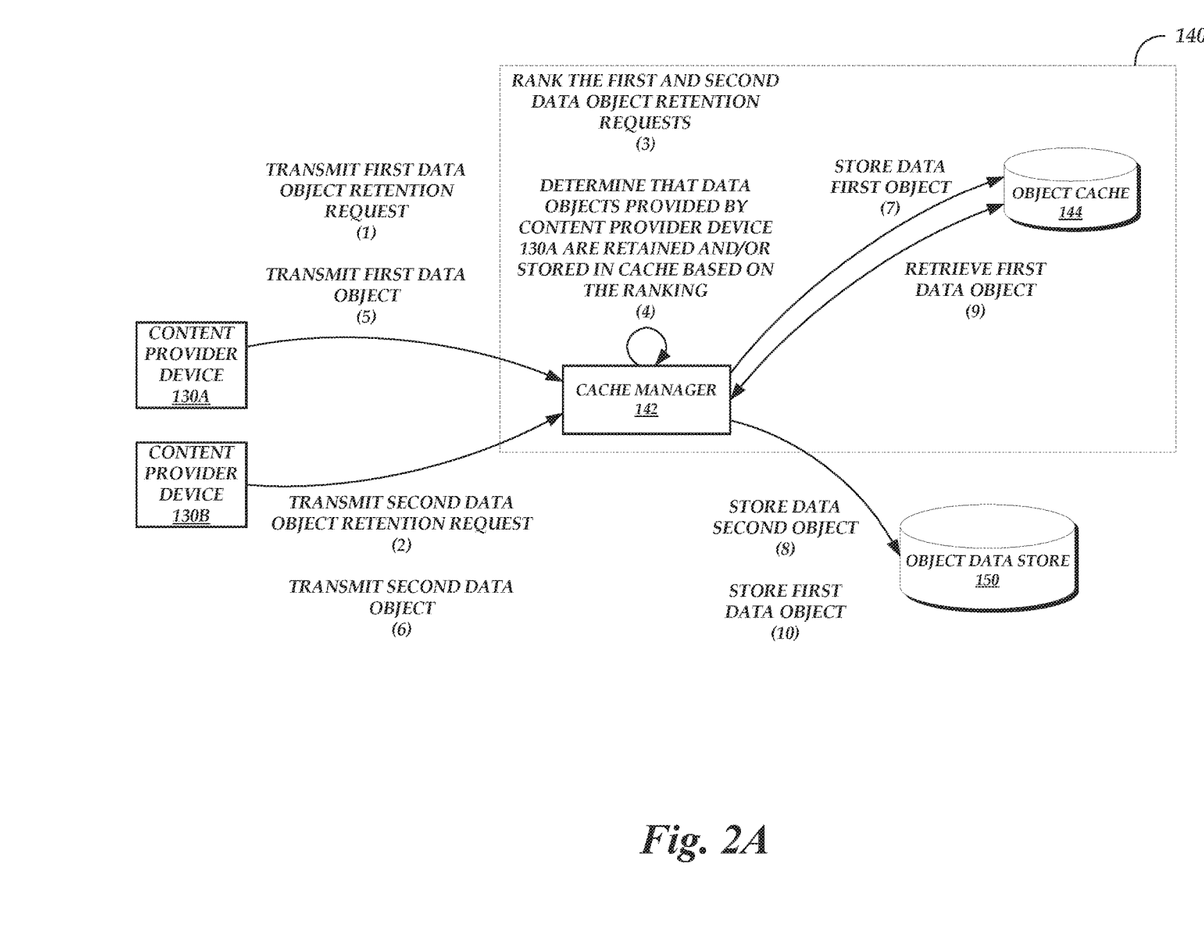
FIG. 2A is a block diagram of the operating environment of FIG. 1 illustrating the operations performed by the components of the operating environment to manage the content stored in the object cache, according to one embodiment.

FIG. 2A is a block diagram of the operating environment 100 of FIG. 1 illustrating the operations performed by the components of the operating environment 100 to manage the content stored in the object cache 144, according to one embodiment. As illustrated in FIG. 2A, the content provider device 130A transmits a first data object retention request to the cache manager 142 at (1). For example, the first data object retention request may be a request-based or time-based data object retention request.

Before, during, or after the content provider device 130A transmits the first data object retention request, the content provider device 130B transmits a second data object retention request to the cache manager 142 at (2). For example, the second data object retention request may be a request-based or time-based data object retention request.

The cache manager 142 can rank the first and second data object retention requests at (3). For example, the cache manager 142 can use the data object retention value included in each data object retention request to score and rank the data object retention requests submitted by the first and second content provider devices 130A-B. In further embodiments, the cache manager 142 can use the data object retention value included in each data object retention request along with other factors like age, popularity, and/or file size of data objects provided by the first and second content provider devices 130A-B that are stored in the object cache 144 to score and rank the data object retention requests submitted by the first and second content provider devices 130A-B.

Based on the ranking, the cache manager 142 determines that data objects provided by the content provider device 130A are retained and/or stored in the object cache 144 at (4). For example, the cache manager 142 may determine that the data objects provided by the content provider device 130A are retained and/or stored in the object cache 144 at least until a time period identified in the first data object retention request expires or at least until a block of data object requests identified in the first data object retention request are serviced by the origin server 140.

During the time period identified in the first data object retention request or while the block of data object requests identified in the first data object retention request are being serviced, the content provider device 130A may transmit a first data object to the cache manager 142 at (5). Before, during, or after the content provider device 130A transmits the first data object, the content provider device 130B transmits a second data object to the cache manager 142 at (6).

Because the cache manager 142 has guaranteed the content provider device 130 that the data objects provided by the content provider device 130 will be stored in the object cache 144 at least until a time period identified in the first data object retention request expires or at least until a block of data object requests identified in the first data object retention request are serviced by the origin server 140, the cache manager 142 stores the first data object in the object cache 144 at (7). In an embodiment, the object cache 144 may be reaching capacity and the cache manager 142 cannot store additional data objects in the object cache 144 other than data objects provided by the content provider device 130A (e.g., due to the highest ranking of the first data object retention request submitted by the content provider device 130A). Thus, the cache manager 142 stores the second data object in the object data store 150 at (8).

As a background process, the cache manager 140 may retrieve the first data object from the object cache 144 at (9), copy the first data object, and store the first data object in the object data store 150 at (10). Thus, a copy of the first data object may also be stored in the object data store 150.

Figure 2B:
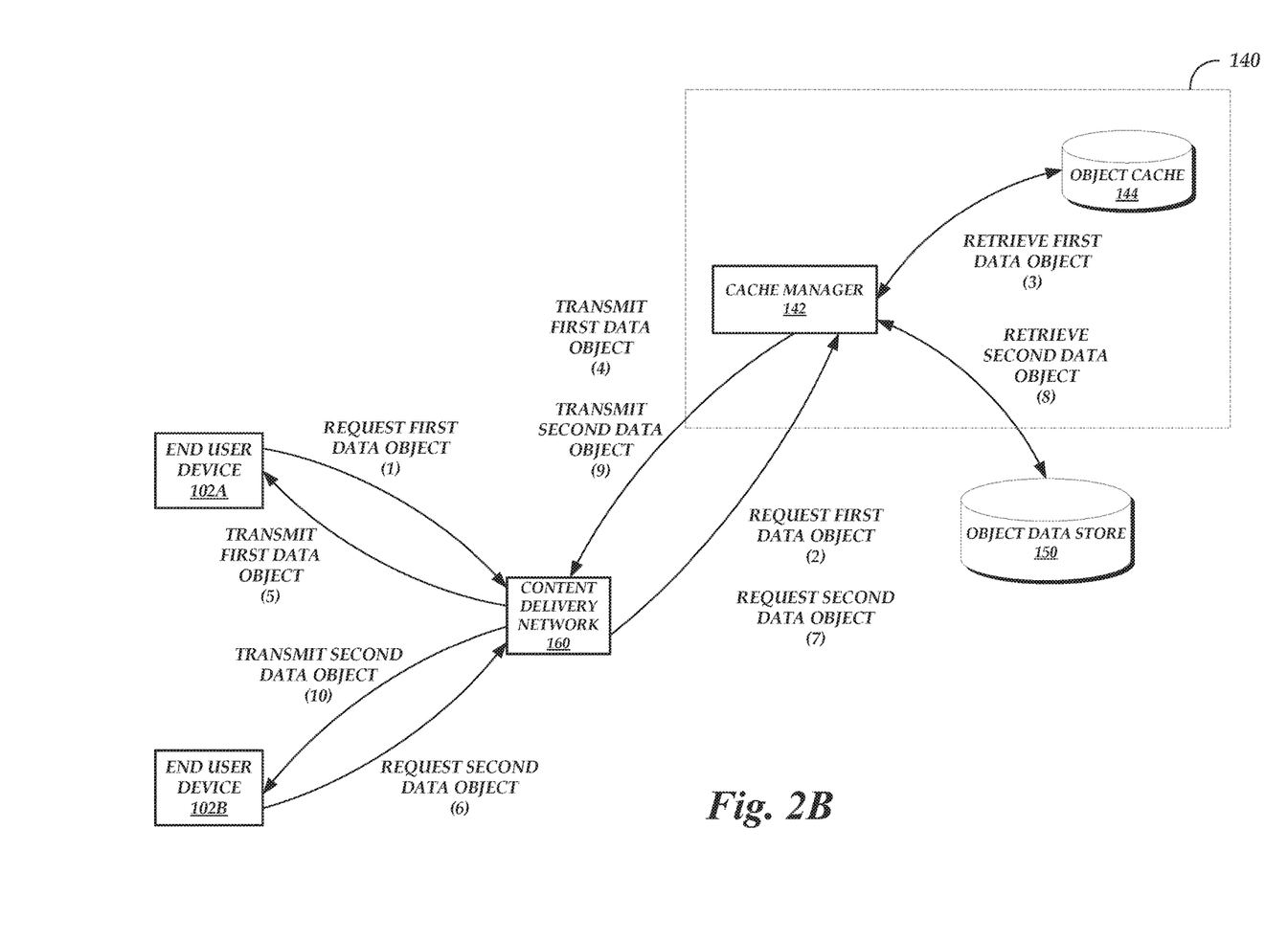
FIG. 2B is a block diagram of the operating environment of FIG. 1 illustrating the operations performed by the components of the operating environment to retrieve a data object from the origin server, according to one embodiment.

FIG. 2B is a block diagram of the operating environment 100 of FIG. 1 illustrating the operations performed by the components of the operating environment 100 to retrieve a data object from the origin server 140, according to one embodiment. As illustrated in FIG. 2B, an end user device 102A transmits a request to the CDN 160 for the first data object at (1). As described herein, the CDN 160 does not include a copy of the first data object for the purposes of the present disclosure. Thus, the CDN 160 forwards the request for the first data object to the cache manager 142 at (2).

The cache manager 142 may query the object cache 144 to determine whether the first data object is stored therein. In this case, the first data object is stored in the object cache 144. Thus, the cache manager 142 retrieves the first data object from the object cache 144 at (3). The cache manager 142 then transmits the retrieved first data object to the CDN 160 at (4), and the CDN 160 forwards the first data object to the end user device 102A at (5).

Before, during, or after the end user device 102A requests the first data object, an end user device 102B transmits a request to the CDN 160 for the second data object at (6). The CDN 160 then forwards the request for the second data object to the cache manager 142 at (7).

The cache manager 142 may query the object cache 144 to determine whether the second data object is stored therein. In this case, the second data object is not stored in the object cache 144. Thus, the cache manager 142 retrieves the second data object from the object data store 150 at (8). The cache manager 142 then transmits the retrieved second data object to the CDN 160 at (9), and the CDN 160 forwards the second data object to the end user device 102B at (10).

Figure 3:
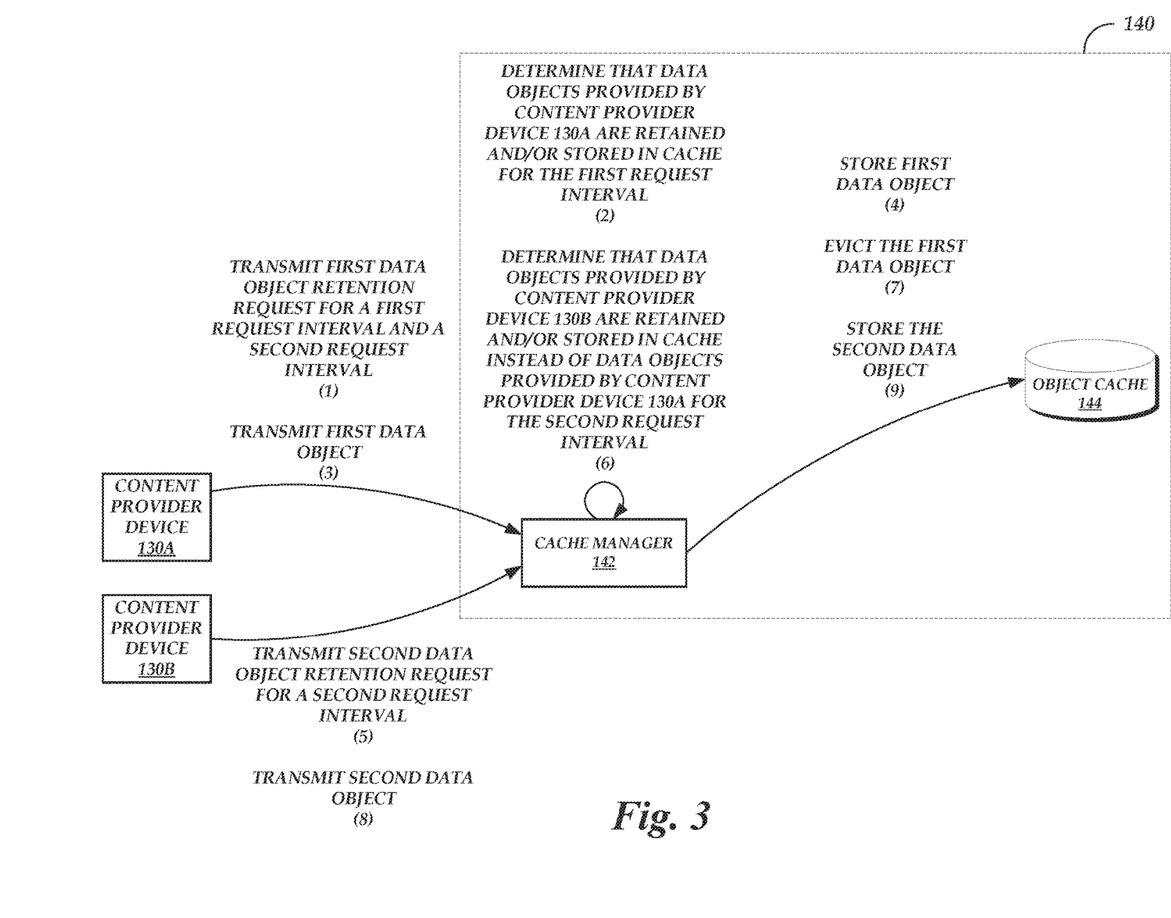
FIG. 3 is another block diagram of the operating environment of FIG. 1 illustrating the operations performed by the components of the operating environment to manage the content stored in the object cache, according to one embodiment.

FIG. 3 is another block diagram of the operating environment 100 of FIG. 1 illustrating the operations performed by the components of the operating environment 100 to manage the content stored in the object cache 144, according to one embodiment. As illustrated in FIG. 3, the content provider device 130A transmits a first data object retention request to the cache manager 142 at (1). For example, the first data object retention request may be for a first and second request interval, where a request interval can be either a block of data object requests or a time period.

In response to the first request interval about to begin, the cache manager 142 can score and rank the first data object retention request along with other data object retention requests received for the first request interval. Based on the rankings, the cache manager 142 determines that the data objects provided by the content provider device 130A are retained and/or stored in the object cache 144 at least until the first request interval passes at (2). For example, the cache manager 142 may have ranked the first data object retention request the highest out of any data object retention request corresponding to the first request interval.

During the first request interval, the content provider device 130A transmits a first data object to the cache manager 142 at (3). Because the cache manager 142 guaranteed that data objects provided by the content provider device 130A will be stored in the object cache 144 at least until the first request interval passes, the cache manager 142 stores the first data object in the object cache 144 at (4).

During the first request interval, the content provider device 130B transmits to the cache manager 142 a second data object retention request at (5). For example, the second data object retention request may be for the second request interval.

In response to the first request interval nearing completion and the second request interval about to begin, the cache manager 142 can score and rank the first data object retention request (e.g., because this request also identifies the second request interval), the second data object retention request, and/or other data object retention requests received for the second request interval. Based on the rankings, the cache manager 142 determines that the data objects provided by the content provider device 130B are retained and/or stored in the object cache 144 instead of data objects provided by the content provider 130A at least until the second request interval passes at (6). For example, the cache manager 142 may have ranked the second data object retention request higher than the first data object retention request (e.g., because a data object retention value in the second data object retention request is higher than a data object retention value in the first data object retention request) and may have determined that the object cache 144 does not have the capacity to store any data object provided by the content provider device 130A.

During the second request interval (e.g., at the start of the second request interval), the cache manager 142 evicts the first data object from the object cache 144 at (7). The content provider device 130B further transmits a second data object to the cache manager 142 at (8). Because the cache manager 142 guaranteed that data objects provided by the content provider device 130B will be stored in the object cache 144 at least until the second request interval passes, the cache manager 142 stores the second data object in the object cache 144 at (9).

Example Cache Management Routine

Figure 4:
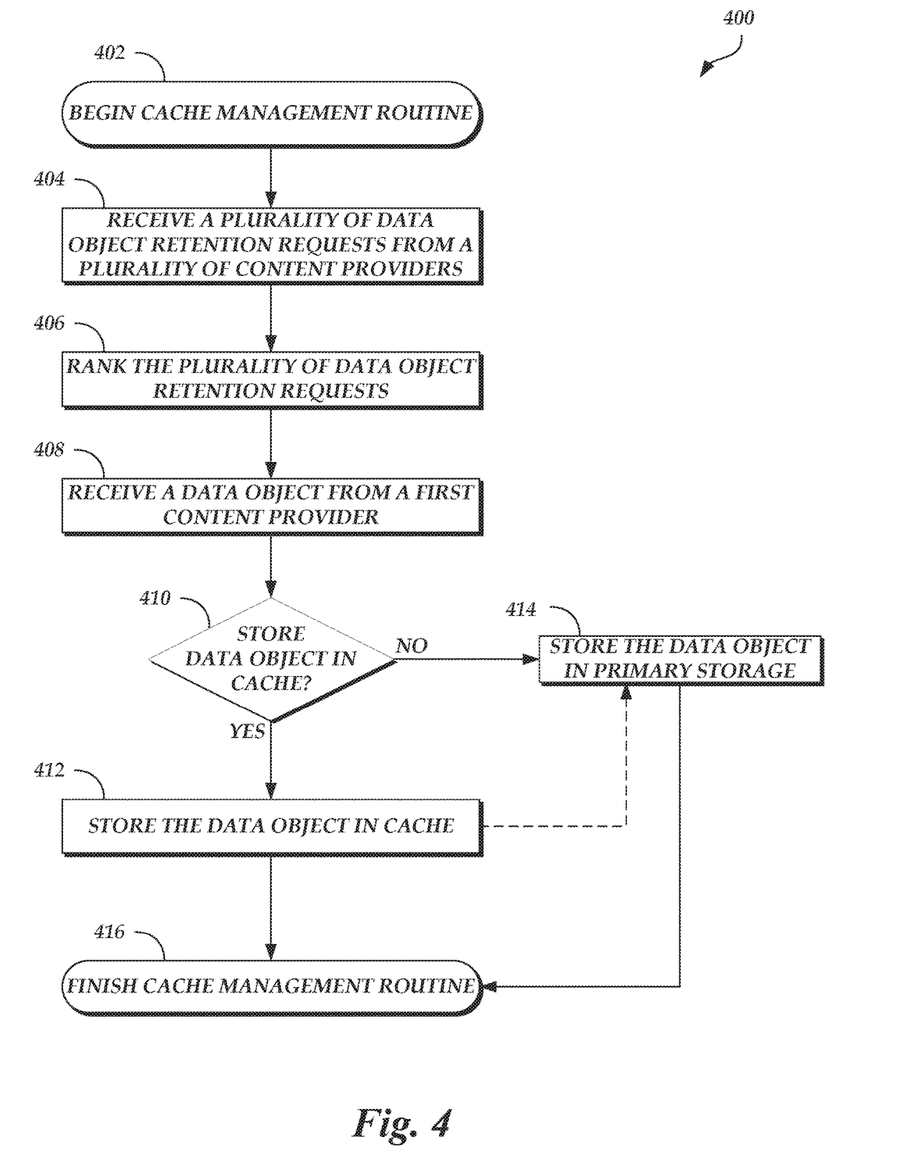
FIG. 4 is a flow diagram depicting a cache management routine illustratively implemented by an origin server, according to one embodiment.

FIG. 4 is a flow diagram depicting a cache management routine 400 illustratively implemented by an origin server, according to one embodiment. As an example, the origin server 140 (e.g., the cache manager 142) of FIG. 1 can be configured to execute the cache management routine 400. The cache management routine 400 begins at block 402.

At block 404, a plurality of data object retention requests from a plurality of content providers is received. For example, the data object retention requests may be request-based or time-based data object retention requests. The data object retention requests may each further include a data object retention value.

At block 406, the plurality of data object retention requests are ranked. For example, the cache manager 142 can score the data object retention requests based on the data object retention requests and/or the age, popularity, and/or file size of data objects provided by the plurality of content providers that are stored in the object cache 144. The cache manager 142 can then rank the scores from highest to lowest to determine the rankings. Based on the rankings, the cache manager 142 determines which data objects to evict from the object cache 144 and/or which data objects to retain and/or store in the object cache 144.

At block 408, a data object is received from a first content provider. The data object may be received during a request interval identified by the plurality of data object retention requests.

At block 410, a determination is made as to whether to store the data object in cache. For example, the determination may be based on a ranking of the data object retention request submitted by the first content provider. If the ranking of the data object retention request submitted by the first content provider is high enough such that the object cache 144 has the capacity to store data objects provided by the first content provider, then the cache management routine 400 determines that the data object can be stored in the object cache 144 and proceeds to block 412. Otherwise, if the ranking of the data object retention request submitted by the first content provider is low enough such that the object cache 144 does not have the capacity to store data objects provided by the first content provider, then the cache management routine 400 determines that the data object cannot be stored in the object cache 144 and proceeds to block 414.

At block 412, the data object is stored in the cache. The cache manager 142 may retain the data object in the object cache 144 at least until the request interval identified by the plurality of data object retention requests passes. After the data object is stored in the cache, the cache management routine 400 ends, as shown at block 416. Alternatively, after the data object is stored in the cache, the cache management routine 400 may proceed instead to block 414. For example, the cache manager 142 may run a background process to copy the data object and then store the copied data object in the primary storage (e.g., the object data store 150).

At block 414, the data object is stored in primary storage. For example, the cache manager 142 stores the data object in the object data store 150. The cache manager 142 may not store the data object in the object cache 144 at least until the request interval identified by the plurality of data object retention requests passes. The cache manager 142 may re-evaluate data object retention requests for the next request interval and, based on the re-evaluation, may or may not retrieve the data object and store the data object in the object cache 144 (e.g., the cache manager 142 may retrieve and store the data object in the object cache 144 if the data object retention request submitted by the first content provider has a higher ranking for the next request interval). After the data object is stored in the primary storage, the cache management routine 400 ends, as shown at block 416.

Illustrative Cache Management Example

Figure 5:
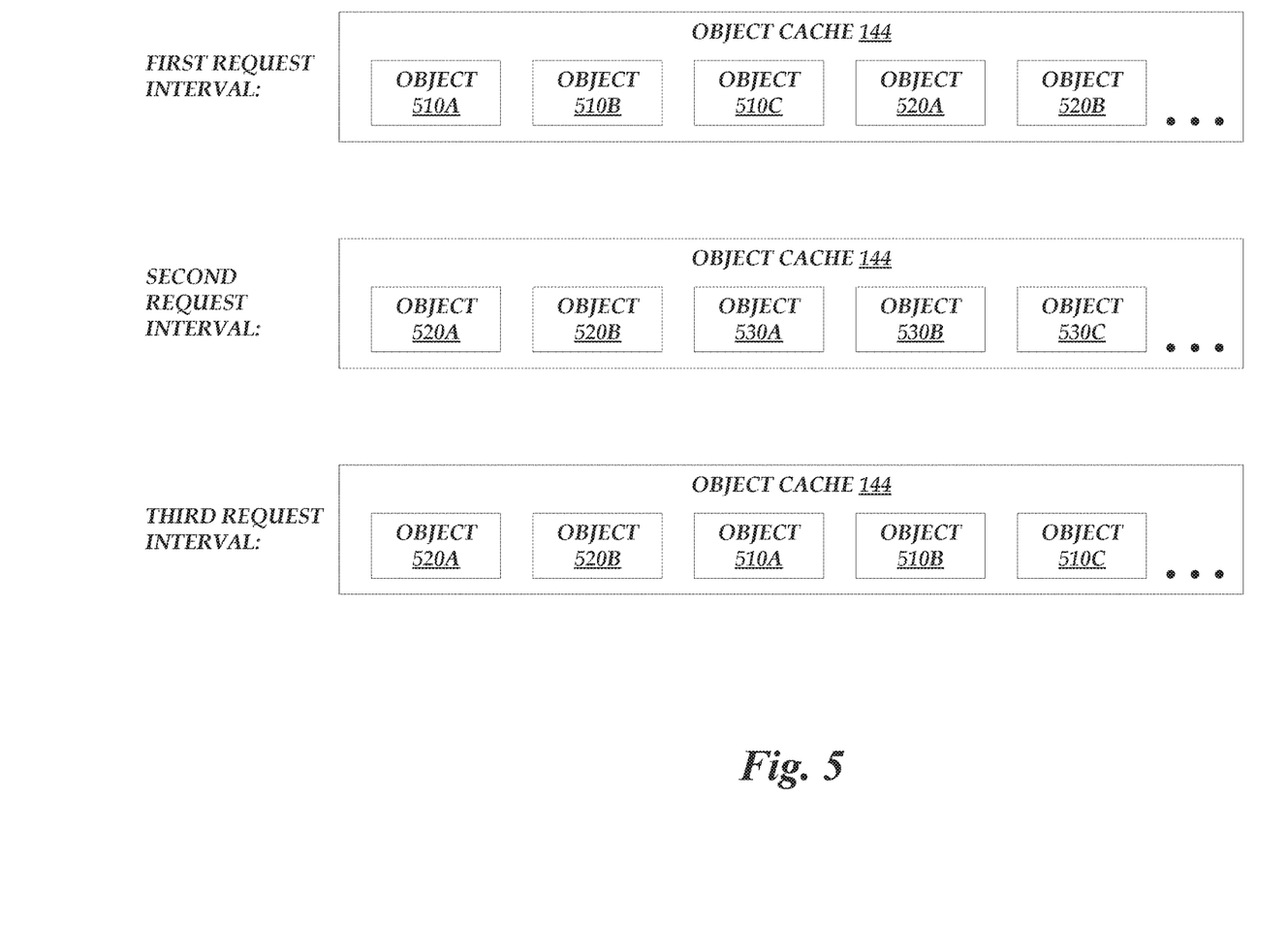
FIG. 5 is a block diagram depicting the content of the object cache during different request intervals, according to one embodiment.

FIG. 5 is a block diagram depicting the content of the object cache 144 during different request intervals, according to one embodiment. As illustrated in FIG. 5, the object cache 144 stores data objects 510A-C and data objects 520A-B during a first request interval. For example, the first request interval may be a block of data object requests or a time period. Data objects 510A-C may correspond to data objects provided by a first content provider device 130 and data objects 520A-B may correspond to data objects provided by a second content provider device 130. The object store 144 may store the data objects 510A-C and 520A-B because data object retention requests submitted by the first and second content provider devices 130 were ranked by the cache manager 142 as the top two submitted data object retention requests. The object cache 144 may further have the capacity to store additional data objects (not shown).

During a second request interval, the object cache 144 stores data objects 520A-B and 530A-C. Data objects 530A-C may correspond to data objects provided by a third content provider device 130. As illustrated in FIG. 5, the object cache 144 no longer includes the data objects 510A-C. For example, the second and third content provider devices 130 may have submitted data object retention requests identifying the second request interval that the cache manager 142 ranked higher than a data object retention request submitted by the first content provider device 130 that identified the second request interval. The data objects 520A-B and/or 530A-C may have a file size large enough such that the object cache 144 cannot also store the data objects 510A-C. Thus, the cache manager 142 evicted the data objects 510A-C from the object cache 144 at least until the second request interval passes.

During a third request interval, the object cache 144 stores data objects 520A-B and 510A-C. As illustrated in FIG. 5, the object cache 144 no longer includes the data objects 530A-C, but once again includes the data objects 510A-C. For example, the first and second content provider devices 130 may have submitted data object retention requests identifying the third request interval that the cache manager 142 ranked higher than a data object retention request submitted by the third content provider device 130 that identified the third request interval. The data objects 520A-B and/or 510A-C may have a file size large enough such that the object cache 144 cannot also store the data objects 530A-C. Thus, the cache manager 142 evicted the data objects 530A-C from the object cache 144 and re-stored the data objects 510A-C in the object cache 144 (e.g., after retrieving the data objects 510A-C from the object data store 150) at least until the third request interval passes.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of managing an origin server cache, the method comprising:
    receiving, from a first content provider device, a first data object retention request, wherein the first data object retention request comprises an identification of a first request interval and a first data object retention value;
    receiving, from a second content provider device, a second data object retention request, wherein the second data object retention request comprises an identification of the first request interval and a second data object retention value;
    scoring the first data object retention request based at least in part on the first data object retention value;
    scoring the second data object retention request based at least in part on the second data object retention value;
    ranking the first and second data object retention requests based on the scoring of the first and send data object retention requests;
    determining, based on the ranking, that data objects associated with the first content provider device are to be retained in the origin server cache and that data objects associated with the second content provider device are to be evicted from the origin server cache at least until the first request interval passes; and
    evicting the data objects associated with the second content provider device from the origin server cache.

2. The computer-implemented method of claim 1, further comprising:
    receiving a request for a first data object, wherein the first data object is associated with the first content provider device;

retrieving the first data object from the origin server cache; and transmitting the retrieved first data object to satisfy the first data object request.

3. The computer-implemented method of claim 1, further comprising:

receiving a request for a first data object, wherein the first data object is associated with the second content provider device;

retrieving the first data object from an object data store external to an origin server; and transmitting the retrieved first data object to satisfy the first data object request.

4. The computer-implemented method of claim 1, further comprising:

retrieving a first data object from an object data store, wherein the first data object is associated with the first content provider device; and storing the first data object in the origin server cache at least until the first request interval passes.

5. The computer-implemented method of claim 1, wherein the first request interval comprises one of a set number of data object requests or a time period.

6. A system, the system comprising:

an object data store that is configured to store copies of data objects; and an origin server comprising an origin server cache and one or more computing devices in communication with the object data store and configured with specific computer-executable instructions to:

receive a first data object retention request associated with a first content provider, wherein the first data object retention request comprises an identification of a first request interval and a first data object retention value;

receive a second data object retention request associated with a second content provider, wherein the second data object retention request comprises an identification of the first request interval and a second data object retention value;

rank the first and second data object retention requests based at least in part on the first and second data object retention values;

determine, based on the ranking, that data objects associated with the first content provider are to be retained in the origin server cache at least until the first request interval passes; and evict data objects associated with the second provider from the origin server cache.

7. The system of claim 6, wherein the origin server is further configured with specific computer-executable instructions to:

receive a request for a first data object, wherein the first data object is associated with the first content provider;

retrieve the first data object from the origin server cache; and transmit the retrieved first data object to satisfy the first data object request.

8. The system of claim 6, wherein the origin server is further configured with specific computer-executable instructions to:

receive a request for a first data object, wherein the first data object is associated with the second content provider;

retrieve the first data object from the object data store; and transmit the retrieved first data object to satisfy the first data object request.

9. The system of claim 6, wherein the origin server is further configured with specific computer-executable instructions to:

retrieve a first data object from the object data store, wherein the first data object is associated with the first content provider; and store the first data object in the origin server cache at least until the first request interval passes.

10. The system of claim 6, wherein the first request interval comprises one of a set number of data object requests or a time period.

11. The system of claim 6, wherein the origin server is further configured with specific computer-executable instructions to:

score the first data object retention request based at least in part on the first data object retention value;

score the second data object retention request based at least in part on the second data object retention value; and rank the first and second data object retention requests based on the scoring of the first and send data object retention requests.

12. The system of claim 11, wherein the origin server is further configured with specific computer-executable instructions to score the first data object retention request based on at least one of the first data object retention value, an age of data objects associated with the first content provider that are stored in the origin server cache, a popularity of data objects associated with the first content provider that are stored in the origin server cache, or a file size of data objects associated with the first content provider that are stored in the origin server cache.

13. The system of claim 6, wherein the first data object retention value comprises a time-decay function.

14. The system of claim 6, wherein the origin server is further configured with specific computer-executable instructions to:

receive a third data object retention request associated with the first content provider, wherein the third data object retention request comprises an identification of a second request interval and a third data object retention value;

receive a fourth data object retention request associated with the second content provider, wherein the fourth data object retention request comprises an identification of the second request interval and a fourth data object retention value;

rank the third and fourth data object retention requests based at least in part on the third and fourth data object retention values;

determine that the data objects associated with the second content provider are to be retained in the origin server cache after the first request interval passes and at least until the second request interval passes;

evict the data objects associated with the first content provider from the origin server cache;

retrieve the data objects associated with the second content provider from the object data store; and store the data objects associated with the second content provider in the origin server cache.

15. The system of claim 6, wherein the origin server is further configured with specific computer-executable instructions to:

receive a third data object retention request associated with a third content provider, wherein the third data object retention request comprises an identification of the first request interval and a third data object retention value;

rank the first, second, and third data object retention requests based at least in part on the first, second, and third data object retention values; and determine that some, but not all, data objects associated with the third content provider are to be retained in the origin server cache at least until the first request interval passes.

16. The system of claim 6, wherein the first data object retention value represents an importance the first content provider places on having the data objects associated with the first content provider being delivered from the origin cache server rather than from the object data store.

17. Non-transitory, computer-readable storage media comprising computer-executable instructions, wherein the computer-executable instructions, when executed by a computer system, cause the computer system to:

process a first data object retention request associated with a first content provider, wherein the first data object retention request comprises an identification of a first request interval and a first data object retention value;

rank the first data object retention request and other data object retention requests based at least in part on the first data object retention value;

determine, based on the ranking, that data objects associated with the first content provider are to be retained in the origin server cache at least until the first request interval passes;

evict data objects associated with other content providers from the origin server cache at least until the first request interval passes; and retrieve, from an object data store external to the computer system, a first data object associated with the first content provider for storage in the origin server cache at least until the first request interval passes.

18. The non-transitory, computer-readable storage media of claim 17, wherein the computer-executable instructions further cause the computer system to:

process a request for a second data object received from a content delivery network (CDN), wherein the first data object is associated with the first content provider;

retrieve the second data object from the origin server cache; and transmit the retrieved second data object to the CDN to satisfy the second data object request.

19. The non-transitory, computer-readable storage media of claim 17, wherein the computer-executable instructions further cause the computer system to:

process a request for a second data object received from a content delivery network (CDN), wherein the second data object is associated with one of the other content providers;

retrieve the second data object from the object data store; and transmit the retrieved second data object to the CDN to satisfy the second data object request.

20. The non-transitory, computer-readable storage media of claim 17, wherein the computer-executable instructions further cause the computer system to:

score the first data object retention request based at least in part on the first data object retention value; and rank the first data object retention request and the other data object retention requests based at least in part on the scoring of the first data object retention request and a scoring of the other data object retention requests.

* * * * *